April 10, 1934. J. L. KOUBEK 1,954,010
COMBINED TAIL LIGHT AND REFLECTOR SIGNAL
Filed May 11, 1931
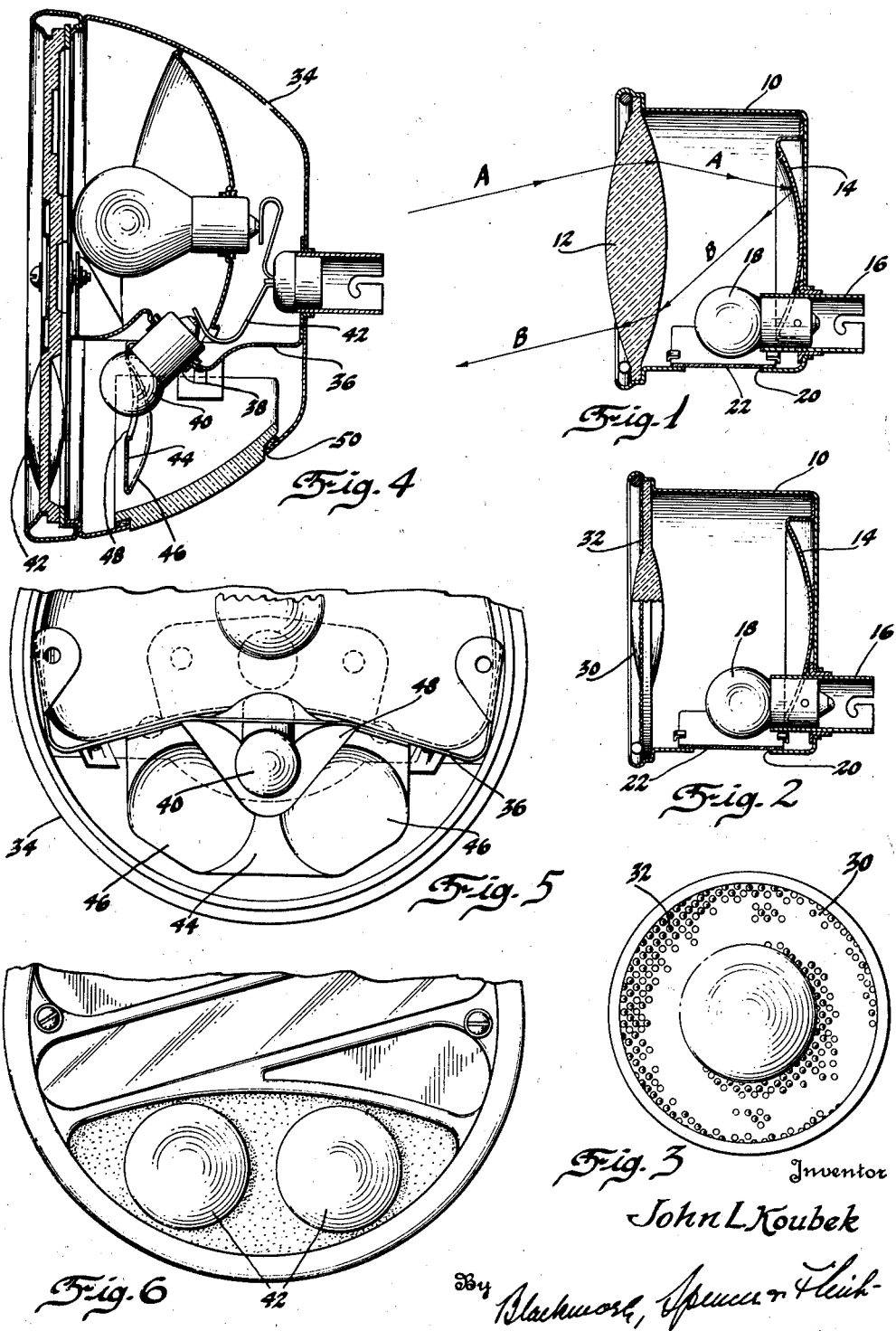

UNITED STATES PATENT OFFICE 1,954,010

COMBINED TAIL-LIGHT AND REFLECTOR SIGNAL

John L. Koubek, Anderson, Ind., assignor, by mesne assignments, to General Motors Corporation, Detroit, Mich., a corporation of Delaware Application May 11, 1931, Serial No. 536,553

3 Claims. (Cl. 177—329)

This invention has to do with a combined reflecting signal and tail light. The signal is of the type in which a concave mirror is arranged at the rear of a condensing lens, the mirror having a radius of curvature substantially equal to the focal length of the lens. Such a signal has the property of reflecting back to a light source the rays projected upon it by the source. Hence it is useful as a safety device for mounting upon the rear of automobiles and bicycles to reflect back to the driver of an approaching car some of the light projected from his own headlamps thereby warning him of the proximity of the vehicle ahead and preventing accidents.

The present invention has to do with the modification of a signal of this type for use as a tail lamp. This I have accomplished by mounting within the housing an incandescent lamp, and I have found that it is important that the lamp should be mounted at the top or bottom of the lamp and preferably in a central position. The advantage of this is that while the reduction in reflecting surface decreases the range within which signals are received and reflected, the reduction is confined to the range in a vertical direction and this is of little importance. The effectiveness of the signal in the case of cars approaching from the rear whether to one side of the road or the other, is practically undisturbed.

Figure 1 is a central vertical section through my improved lamp.

Figure 2 is a similar view of a modification.

Figure 3 is a view of the modified form of lens shown in Figure 2.

Figure 4 is a central vertical section through a second modification.

Figure 5 is a front view of the lower portion of the lamp of Figure 4 with the cover glass removed, while Figure 6 is the same view with the cover glass in place.

In Figure 1, 10 is the housing, in which is secured a condensing lens 12 of any desired configuration. At the rear of the lens and at a distance approximately equal to its focal length is a concave mirror 14, having a radius of curvature substantially equal to the focal length of the lens. At 16 I have shown a lamp socket, protruding through the rear wall of the housing and into a notch in the bottom of the mirror 14. In the socket is mounted the lamp 18. An aperture 20 in the adjacent side wall of the lamp housing, covered by a glass cover 22, permits rays from the lamp to illuminate the license plate.

Normally in driving at night the lamp 18 will be lighted and its rays will be projected through the lens and also onto the license plate. If the lamp should become extinguished the device will operate as a signal in the following manner.

I have indicated at A the path of a ray of light, e. g., from the headlamp of a following car, striking the lens 12, and being returned by the mirror 14 along a path B parallel to its original direction. It will be noted that the optical system is symmetrical so that the reflecting action takes place throughout a wide range of angle of the entering ray. This action is particularly important in a horizontal plane, for it results in the driver of a following car receiving a signal composed of light returned from his own headlamps even though his car is quite a bit to one side or the other of the path of travel of the car carrying the signal. The same action will take place in a vertical plane, except that the lamp cuts off a part of the reflector and in the design shown this limits the action to rays entering from above at angles not exceeding 20°. This is sufficient range in a vertical direction.

In Figures 2 and 3 I have illustrated a modification in which the lens 30 is of reduced diameter and is provided with a diffusing margin 32 of any desired configuration. This gives a greater spread to the light emitted from the lamp.

In Figures 4 to 6 I have shown the application of my invention to a more or less conventional design of combined tail lamp, stop signal and backing light. The parts pertinent to the present invention consist of the housing 34, provided with partition 36 defining a tail lamp compartment. The partition is formed to provide a socket 38, in which the lamp 40 is mounted, held in place by the contact spring 42. Depending from the partition and at the proper distance from the condensing lenses 42, is a stamping 44, formed to provide two concave mirrors 46. The upper edge of the mirror is notched at 48 to receive the lamp 40. This form of the invention operates in the same manner as those previously described except that there are, of course, two reflecting signals in place of one. The lenses for both the upper and lower compartments may be molded of one piece of glass as shown. The housing may be provided with the license plate illuminating aperture 50, as shown.

I claim:

1. A signal lamp comprising a housing, a concentrating lens in the housing, a concave mirror arranged in the housing and having a radius of curvature substantially equal to the focal length of the lens, said mirror being positioned at the rear of the lens and at a distance therefrom substantially equal to its focal length so that the mirror receives light rays passing through the lens and projects them forwardly in directions parallel to the directions of the incident rays, and an incandescent bulb mounted within the housing, lying approximately at an extremity of a central vertical plane passing through the mirror so that compactness is attained without reducing the lateral range of the signal, said housing being provided with an aperture in its side wall adjacent the bulb for illuminating the usual license plate.

2. A signal lamp comprising a housing, a concentrating lens in the housing, a concave mirror arranged in the housing and having a radius of curvature substantially equal to the focal length of the lens, said mirror being positioned at the rear of the lens and at a distance therefrom substantially equal to its focal length so that the mirror receives light rays passing through the lens and projects them forwardly in directions parallel to the direction of the incident rays, said mirror being notched adjacent one margin and in an approximately central vertical plane, a lamp socket mounted in the rear wall of the housing and projecting into said notch, a lamp in said socket, said housing being provided with an aperture in a side wall adjacent said lamp, and a transparent cover for said aperture to permit illumination of the license plate.

3. A signal lamp comprising a housing, a concentrating lens in the housing, a concave mirror arranged in the housing and having a radius of curvature substantially equal to the focal length of the lens, said mirror being positioned at the rear of the lens and at a distance therefrom substantially equal to its focal length so that the mirror receives light rays passing through the lens and projects them forwardly in directions parallel to the direction of the incident rays, said lens being provided with an annular roughened portion for diffusing the reflected rays, and a light source mounted in the housing and lying approximately at the extremity of a central vertical plane passing through the mirror and projecting thereover whereby compactness is attained without impairing the lateral range of the signal.

JOHN L. KOUBEK.